US010131195B2

(12) United States Patent
Bowden (10) Patent No.: US 10,131,195 B2
(45) Date of Patent: Nov. 20, 2018

(54) BASE UNIT FOR A VEHICLE (71) Applicant: Niftylift Limited, Milton Keynes (GB)

(72) Inventor: Roger Bowden, Milton Keynes (GB)

(73) Assignee: NIFTYLIFT LIMITED, Milton Keynes (GB)

(*) Notice: Subject to any disclaimer, the term of this patent is extended or adjusted under 35 U.S.C. 154(b) by 33 days.

(21) Appl. No.: 14/430,287

(22) PCT Filed: Oct. 9, 2013

(86) PCT No.: PCT/GB2013/052621
§ 371 (c)(1),
(2) Date: Mar. 23, 2015

(87) PCT Pub. No.: WO2014/060721
PCT Pub. Date: Apr. 24, 2014

(65) Prior Publication Data
US 2015/0239318 A1    Aug. 27, 2015

(30) Foreign Application Priority Data

Oct. 15, 2012   (GB) .................................. 1218502.1

(51) Int. Cl.
*B66F 11/04*    (2006.01)
*B60G 17/02*    (2006.01)
(Continued)

(52) U.S. Cl.
CPC ............. *B60G 17/021* (2013.01); *B60G 3/08* (2013.01); *B60G 17/005* (2013.01); *B60K 7/00* (2013.01);
(Continued)

(58) Field of Classification Search
CPC .......... B66F 11/04; B66F 11/044; B60G 9/02; B60G 17/00; B60G 2204/46;
(Continued)

(56) References Cited

U.S. PATENT DOCUMENTS 3,738,679 A    6/1973  Jackson
3,771,812 A *  11/1973 Pierce .................... B62D 61/12
                                                         180/24.02
(Continued)

FOREIGN PATENT DOCUMENTS

CA    1257627       7/1989
GB    2 141 078    12/1984
(Continued)

OTHER PUBLICATIONS

International Search Report issued in International Application No. PCT/GB2013/052621, dated Dec. 16, 2013.

*Primary Examiner* — Daniel P Cahn
(74) *Attorney, Agent, or Firm* — Knobbe, Martens, Olson & Bear, LLP (57) ABSTRACT

A base unit for a vehicle such as a mobile work platform includes a chassis and multiple wheels, at least one of the wheels being mounted on the chassis by a suspension mechanism including a suspension element. The suspension element pivots relative to the chassis about a substantially horizontal pivot axis between an upper position and a lower position, and a stop member engages the suspension element in the upper position to limit its upwards movement. A biasing mechanism exerts a biasing force on the suspension element to urge the suspension element upwards towards the upper position. The biasing mechanism includes an actuator which adjusts the biasing force so that, in a first operating condition, the biasing force is greater than the force needed to maintain the suspension element in engagement with the stop member when the wheel is suspended, and in a second operating condition the biasing force is less than the force needed to maintain the suspension element in engagement with the stop member when the wheel is suspended.

15 Claims, 6 Drawing Sheets

(51) Int. Cl.
  *B60G 17/005* (2006.01)
  *B60G 3/08* (2006.01)
  *B60K 7/00* (2006.01)

(52) U.S. Cl.
  CPC ............ *B66F 11/04* (2013.01); *B66F 11/046* (2013.01); *B60G 2204/46* (2013.01); *B60G 2300/06* (2013.01)

(58) Field of Classification Search
  CPC ........ B60G 2204/4605; B60G 2204/61; B60G 2204/62; B60G 17/005; B60G 17/021; B60G 17/0272; B60P 1/045; B62D 61/12; B61D 61/125
  USPC .............. 280/163, 124.11, 124.111, 124.125, 280/124.134, 124.164, 124.179, 124.1, 280/124.101, 124.102; 267/255
  See application file for complete search history.

(56) References Cited

U.S. PATENT DOCUMENTS

| | | | | |
|---|---|---|---|---|
| 3,889,778 A * | 6/1975 | Dotts | .................... | B66F 11/042 182/115 |
| 4,373,738 A * | 2/1983 | Lange | .................... | B62D 7/144 180/22 |
| 4,911,466 A * | 3/1990 | Blair | ........................ | B60G 3/26 280/124.134 |
| 4,995,633 A * | 2/1991 | Santo | .................... | B60G 3/265 280/124.145 |
| 5,044,614 A * | 9/1991 | Rau | ...................... | B60G 15/062 267/175 |
| 5,167,295 A | 12/1992 | Moog | | |
| 5,292,149 A * | 3/1994 | Luger | ..................... | B60G 3/26 280/5.521 |
| 5,477,948 A * | 12/1995 | Stevens | ................ | B60G 15/065 267/221 |
| 5,553,836 A * | 9/1996 | Ericson | .................. | B60G 11/16 267/177 |
| 5,560,637 A * | 10/1996 | Lee | .......................... | B60G 3/26 280/124.139 |
| 5,711,514 A * | 1/1998 | Lu | ......................... | B62K 25/04 188/322.15 |
| 5,803,443 A * | 9/1998 | Chang | .................. | B60G 15/063 267/177 |
| 5,853,183 A * | 12/1998 | VanDenberg | ............ | B60G 9/00 267/234 |
| 5,915,705 A * | 6/1999 | VanDenberg | ............ | B60G 9/00 280/43.17 |
| 5,961,106 A * | 10/1999 | Shaffer | ................ | B60G 13/008 267/221 |
| 6,182,989 B1 * | 2/2001 | Negele | ..................... | B60G 9/02 280/124.116 |
| 6,264,221 B1 * | 7/2001 | Bowden | ............... | B60G 17/005 267/255 |
| 6,691,991 B1 * | 2/2004 | Huang | ................. | B60G 15/063 267/286 |
| 6,902,045 B2 * | 6/2005 | Oliver | .................. | B60G 15/063 188/321.11 |
| 9,027,938 B1 * | 5/2015 | Kasian | ................... | B60G 17/00 267/177 |
| 9,387,880 B2 * | 7/2016 | Gano | ....................... | B60G 3/02 |
| 2002/0038929 A1 * | 4/2002 | Now | .................... | B60G 15/065 267/217 |
| 2002/0171223 A1 * | 11/2002 | Chan | .................... | B60G 15/063 280/124.179 |
| 2003/0122336 A1 * | 7/2003 | Zadok | ..................... | B60G 3/06 280/124.106 |
| 2006/0213733 A1 * | 9/2006 | Masaki | ................ | B60G 15/063 188/299.1 |
| 2010/0252972 A1 * | 10/2010 | Cox | .................... | B60G 15/063 267/218 |
| 2013/0020775 A1 * | 1/2013 | Beji | ....................... | B60B 35/10 280/43 |

FOREIGN PATENT DOCUMENTS

| | | |
|---|---|---|
| GB | 2 334 015 | 8/1999 |
| WO | WO 90/08228 | 7/1990 |
| WO | WO 98/14360 | 4/1998 |

* cited by examiner

BASE UNIT FOR A VEHICLE

RELATED APPLICATIONS

The instant application is the U.S. National Phase under 35 U.S.C. § 371 of International Application No. PCT/GB2013/052621 entitled BASE UNIT FOR A VEHICLE, filed Oct. 9, 2013, designating the U.S, which claims priority under 35 U.S.C. § 119(a)-(d) to Great Britain Patent Application No. 1218502.1, filed Oct. 15, 2012, the content of which is herein incorporated by reference in its entirety.

Field of the Invention

The present invention relates to a base unit for a vehicle, for example for a mobile elevating work platform (MEWP). The base unit may also be used with other vehicles such as forklifts or telescopic handling machines ("telehandlers"). The invention also relates to a vehicle having such a base unit.

BACKGROUND OF THE INVENTION

Mobile elevating work platforms generally have a cage for an operator that is mounted on the end of a hydraulically-operated boom. The boom is mounted on a base unit and can be moved up and down or from side-to-side under the control of an operator in the cage.

The base unit is provided with drive wheels and is fully mobile. It is stabilised by the weight of the base unit and a counter-weight attached to the boom.

In one known type of MEWP the chassis of the base unit is entirely rigid: the wheels are mounted on rigid axles without any form of suspension and have very hard tyres. This provides the stability to ensure that the base unit does not tilt when the boom is extended to one side of the base unit. The base unit is very heavy, and the wheels and tyres provide a significant part of the weight of the base unit.

One disadvantage of using a rigid chassis is that when the MEWP is standing on an uneven surface one of the wheels may be raised off the ground. This does not seriously affect the stability of the platform as the weight of the lifted wheel still contributes to the overall weight of the base unit. However, having one wheel out of contact with the ground can be disconcerting for the operator. Also, if the lifted wheel is a drive wheel, drive from that wheel will be lost.

GB2334015A describes a MEWP in which the base unit includes a suspension mechanism that includes, for each drive wheel, a swing arm on which the wheel is mounted. The swing arm is arranged to pivot about a substantially horizontal pivot axis and a stop member is provided on the chassis that engages the swing arm to limit upwards movement. The swing arm engages the stop members when the mobile access platform is standing on flat, level ground and the platform cannot therefore tilt significantly, ensuring stability.

A biasing spring is connected to each swing arm, which biases the swing arm upwards towards the stop member. The biasing force is however slightly less than the force needed to maintain the swing arm in engagement with the stop member when the wheel is unsupported. Therefore, when the MEWP is standing on uneven ground, one or other of the swing arms can pivot downwards from its normal position in engagement with the stop member, allowing the unsupported wheel to drop into contact with the ground. All four wheels can therefore maintain contact with the ground even when the platform is standing on or travelling over uneven ground. This improves the confidence of the operator and maintains drive from both of the drive wheels. Also, as the swing arm is biased upwards towards the stop member, the weight of that arm and the associated wheel contribute to the overall weight of the base unit and to the stability of the platform.

The force that the dropped wheel exerts on the ground can be controlled by adjusting the biasing force applied by the spring. Normally, the spring is adjusted so that most of the weight of the dropped wheel and the swing arm is carried by the spring, so that this weight contributes to the stability of the MEWP. This means however that the wheel exerts only a small force on the ground, which can cause it to slip when drive is applied. Reducing the force applied by the spring will increase the force exerted by the wheel on the ground and reduce the risk of slip, but will also reduce the stability of the MEWP. It may therefore be difficult to achieve an ideal compromise between these two conflicting requirements. Furthermore, the fact that the swing arms can pivot downwards from their normal positions in engagement with the stop members may lead to a perceived, but incorrect, impression that the platform has become unstable.

It is an object of the present invention to provide a base unit for a vehicle that mitigates at least one of the aforementioned disadvantages, or that provides one or more advantages over the previous arrangement.

SUMMARY OF THE INVENTION

According to the present invention there is provided a base unit for a vehicle, the base unit including a chassis and a plurality of wheels, at least one of said wheels being mounted on the chassis by a suspension mechanism comprising a suspension element, said suspension element being arranged to pivot relative to the chassis about a substantially horizontal pivot axis between an upper position and a lower position, a stop member arranged to engage the suspension element in the upper position to limit upwards movement thereof, and a biasing mechanism arranged to exert a biasing force on the suspension element to urge the suspension element upwards towards the upper position, said biasing mechanism including an actuator operable to adjust the biasing force so that, in a first operating condition the biasing force is greater than the force needed to maintain the suspension element in engagement with the stop member when the wheel is suspended, and in a second operating condition the biasing force is less than the force needed to maintain the suspension element in engagement with the stop member when the wheel is suspended.

Because the suspension element cannot move upwards from its upper position in engagement with the stop member, the platform cannot tilt significantly, this being essential for stability. The suspension element is normally maintained in this position by the biasing mechanism, even if one of the wheels is suspended above the ground, to ensure that the stability is not compromised. However, by activating the actuator the suspension element can be allowed to drop down to the lower position so that it can maintain contact with the ground even when the platform is standing on or travelling over an uneven surface. This improves the confidence of the operator and, if the wheels are driven, allows drive to be provided by all the drive wheels. However, as a large part of the weight of the suspension element and the attached wheel is still carried by the chassis, this weight contributes to the overall weight of the base unit and to the stability of the platform.

Advantageously, the biasing mechanism includes a resilient biasing element that biases the suspension element towards the upper position, and the actuator is operable to urge the suspension element towards the lower position. This provides a simple and effective mechanism for selecting the operating condition of the suspension mechanism according to the operational circumstances.

Advantageously, the resilient biasing element applies a biasing moment $M_B$ to the suspension element that has a value that is greater than the weight moment $M_W$ of the suspension element when the suspension element is in the upper position. In a preferred embodiment, the resilient biasing element applies a biasing moment $M_B$ to the suspension element that has a value in the range 1.0 to 1.5, preferably 1.0 to 1.1, times the weight moment $M_W$ of the suspension element when the suspension element is in the upper position. Therefore, when the drive system is not being used and the hydraulic actuator is not pressurised, the suspension elements are urged upwards and are held in their housings. Because the force exerted by the resilient biasing element is more than the force needed to lift the wheel, the full mass of the wheel assembly contributes to the overall weight of the base unit. The stability of the platform is not therefore compromised.

For example, the suspension element and wheel of a large MEWP may typically weigh approximately 200 kg and the resilient biasing member (for example a spring) may be arranged to exert a moment on the suspension element that is sufficient to support a weight of approximately 210 kg (allowing also for the additional moment needed to overcome pin frictions and to compensate for hysteresis in the biasing member). Therefore, when the platform is standing on uneven ground and one of the wheels is suspended above the ground, its full weight contributes to the stability of the MEWP.

Advantageously, the actuator is operable to apply an actuator moment $M_A$ to the suspension element, where $M_A$ has a value greater than the value of $M_B-M_W$ when the suspension element is in the lower position, where $M_B$ is the biasing moment and $M_W$ is the weight moment. The force exerted on the ground may then be determined from the turning moments acting on the suspension elements, where the moment $M_G$ resulting from the reaction force acting on the wheel from the ground is: $M_G=M_A-M_B$.

In a preferred embodiment $M_A$ has a value in the range 1.0 to 1.5, preferably 1.0 to 1.2, times greater than the value of $M_B-M_W$. This ensures that the wheel is able to transmit drive to the ground without unduly affecting the stability of the vehicle. For example, if the suspension element and wheel weigh approximately 200 kg and the resilient biasing member is able to support a weight of approximately 210 kg, the actuator may be arranged to exert a force equivalent to a weight of 30 kg so that the wheel is pressed against the ground with a force of 20 kg (allowing for any pin frictions, spring rates and hysteresis). It should be understood that these figures are only illustrative. The actual forces may be much larger or much smaller depending on the size and design of the MEWP.

Advantageously, the resilient biasing element is configured to apply a closing force to the actuator.

Advantageously, the base unit includes an adjuster device, for example an adjustable bolt, for adjusting the bias force applied by the resilient biasing element.

Advantageously, the base unit includes a pair of opposed suspension elements arranged to pivot about substantially horizontal pivot axes, and a common biasing mechanism that interconnects the two opposed suspension elements. This simplifies the mechanism and reduces the number of parts and the weight of the mechanism. In particular, as three points are required to define a plane, three of the wheels will always be in contact with the ground. The fourth wheel will drop into contact with the ground but will only press lightly on the ground. Therefore the machine only needs suspension on two opposed wheels (that is, on one axle) and the suspension for only one wheel of an axle is required to operate at any one time. This allows much of the spring/actuator mechanism to be shared between the two opposed wheels, thereby greatly reducing the cost and complexity of the system. Alternatively, each suspension element may include a separate biasing mechanism.

Advantageously, the suspension mechanism includes a drive device for driving the wheel, for example a hydraulic drive motor or any other suitable drive mechanism.

Advantageously, the base unit may include at least one wheel that is mounted rigidly to the chassis. Advantageously, the rigidly mounted wheel or wheels are steerable. Alternatively, a suspension mechanism may be provided for all four wheels. Also, all four wheels may be steered and/or driven.

According to another aspect of the invention there is provided a vehicle including a base unit according to any one of the preceding statements of invention, and a lifting mechanism mounted on the base unit.

Advantageously, the vehicle includes a control system for controlling operation of the lifting mechanism, said control system including a control device configured to control operation of the actuator and operable to select either the first operating condition or the second operating condition. The control device may for example consist of or be part of the control console or it may be part of a control system located elsewhere on the vehicle.

Advantageously, the control system is configured to prevent actuation of the actuator when the lifting mechanism is in a lifted condition, so that when the lifting mechanism is in a lifted condition each suspension element is located in the upper position. Therefore, when the lifting mechanism is activated, pressure will be released from the actuator and each suspension element will either remain in or return slowly to the upper position. This ensures that the base unit has maximum stability when the lifting mechanism is activated. Further, in the event of a failure of the control system or the hydraulic system, the actuator is preferably deactivated so that the spring returns the wheel to a safe, stable position.

In one preferred embodiment, the vehicle is a mobile elevating work platform having a work platform mounted on the lifting mechanism.

Certain embodiments of the invention will now be described, by way of example, with reference to the accompanying drawings, in which.

BRIEF DESCRIPTION OF THE DRAWINGS

DETAILED DESCRIPTION OF THE PREFERRED EMBODIMENT

Figure 1:
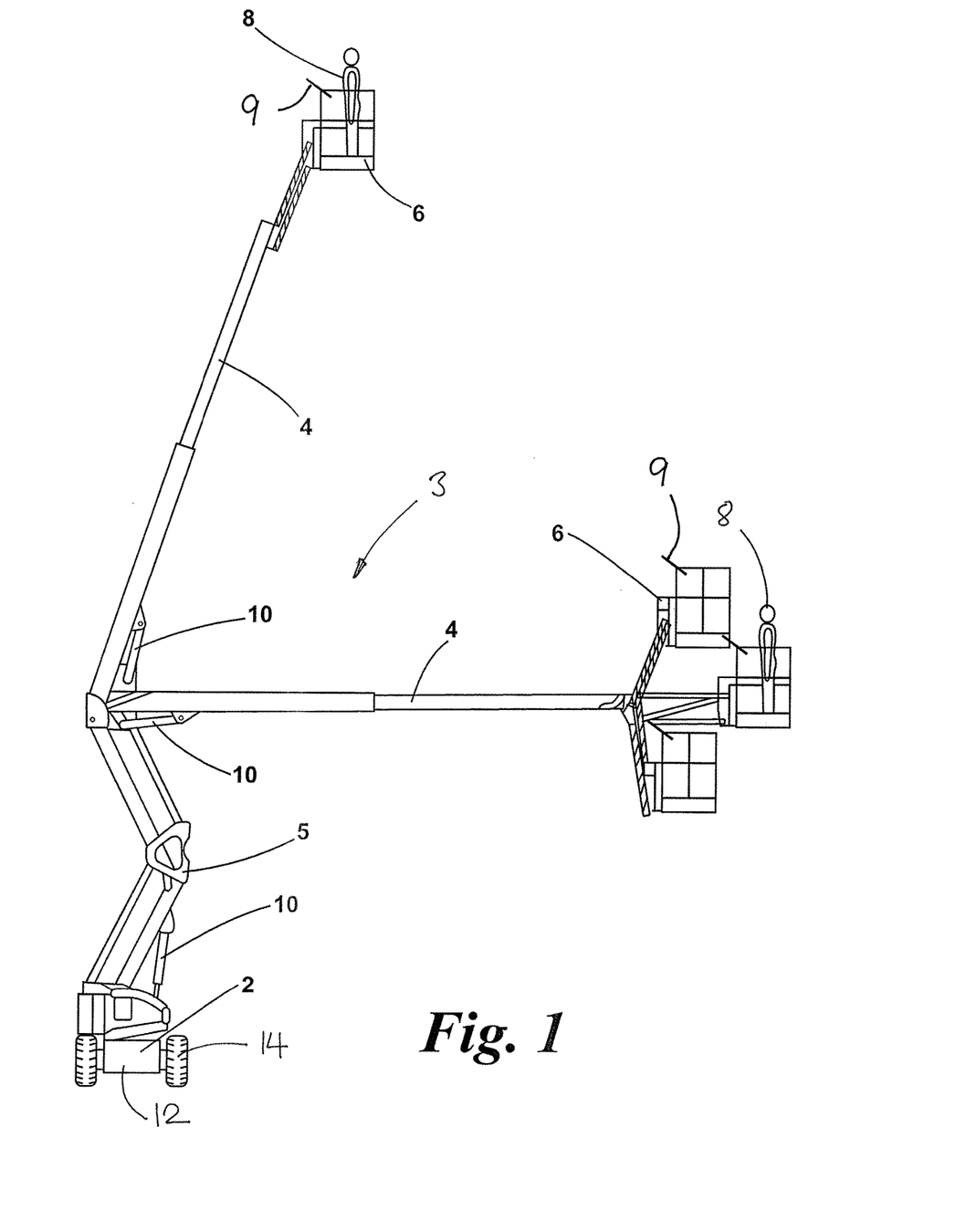
FIG. 1 is an end view of a mobile elevating work platform according to a first embodiment of the invention.

FIG. 1 shows a typical mobile elevating work platform, which includes a wheeled base 2, a hydraulically operated lifting mechanism 3 comprising an extending boom 4 and a rising structure 5, and a cage 6 for a human operator 8, including a control console 9 for controlling operation of the MEWP. The boom 4, which is shown here in two different operating positions, may be retracted and folded onto the wheeled base 2 for transportation or storage. Movement of the boom is controlled by various hydraulic cylinders 10, which are connected to a hydraulic drive system (not shown) that is controlled via the control console 9.

The components of the MEWP as described above are all conventional and will not therefore be described in further detail. It should be understood that the mobile elevating work platform may take various alternative forms.

In this example the base unit 2 includes a chassis 12, a pair of steerable wheels 14 that are mounted in conventional manner on a fixed axle at the front end of the chassis 12 and a pair of drive wheels 16a, 16b (shown in FIGS. 2 and 3) that are mounted at the rear of the chassis 12. The drive wheels 16a, 16b may be driven by, for example, hydraulic drive motors (not shown). Although in this embodiment only the rear wheels are driven it should be understood that all of the wheels may alternatively be driven.

Each rear drive wheel 16a, 16b is mounted on a suspension element comprising in this embodiment a swing arm 18a, 18b that can pivot vertically about a horizontal pivot pin 20 that extends through the lower part of the swing arm in a direction parallel to the longitudinal axis of the chassis 12. Alternatively, the suspension element may comprise a double wishbone or short-long arm suspension, or any other suitable suspension mechanism. The swing arm 18a, 18b contains a drive motor for the wheel and extends outwards through a housing 22 on the side of the chassis 12. The upper, inner part of the swing arm 18a, 18b engages a stop member 23 on the side of the chassis to restrict upwards movement of the swing arm 18a, 18b. When the base unit 2 is standing on flat, level ground, each swing arm 18a, 18b engages the respective stop member 23 and cannot move upwards from that position, thereby ensuring the stability of the machine.

In the following description, the two rear wheels will be referred to as a left rear wheel 16a and a right rear wheel 16b, and the two swing arms will be referred to as a left swing arm 18a and a right swing arm 18b.

Figure 4:
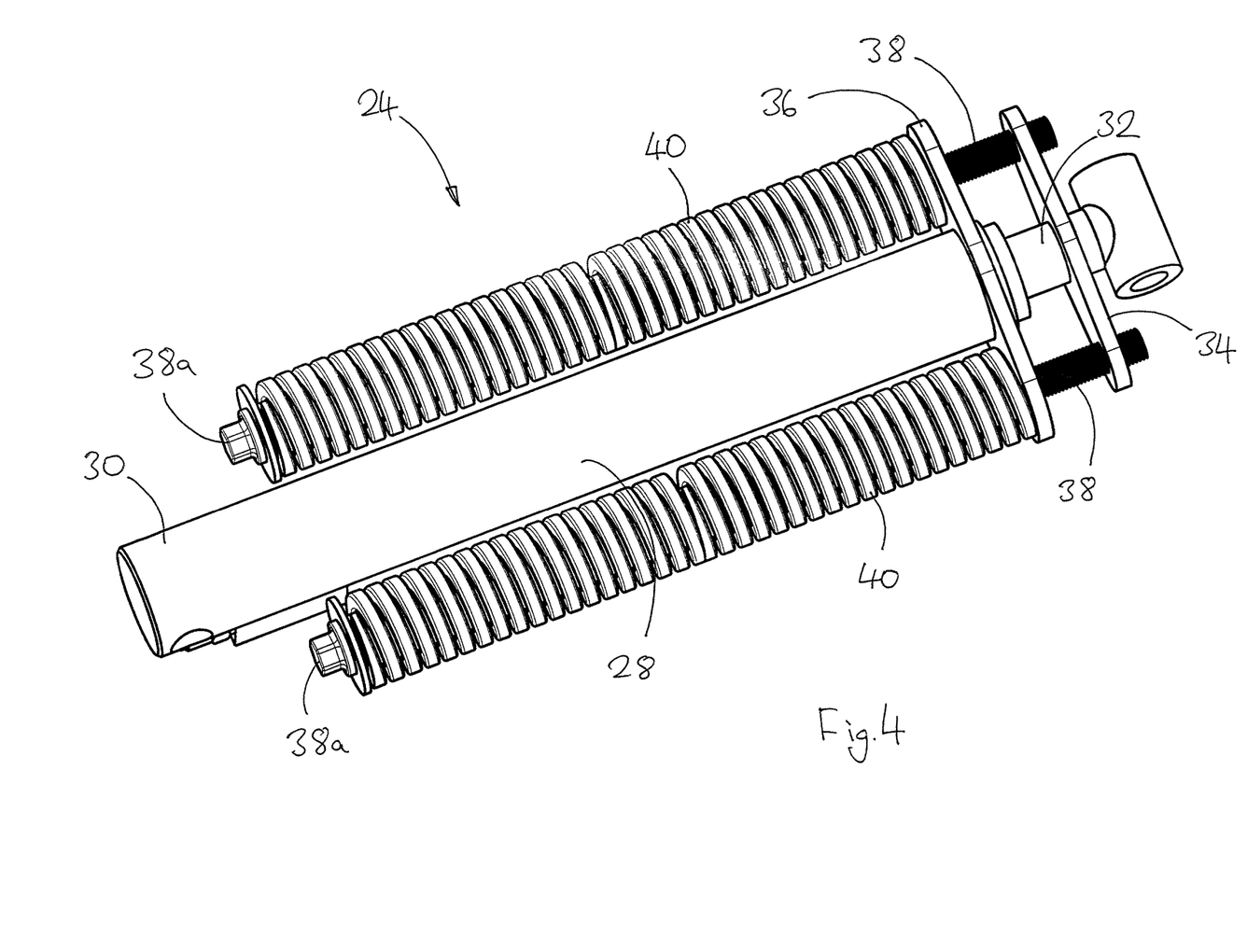
FIG. 4 is an isometric view showing part of the base unit at an enlarged scale.

The left and right swing arms 18a, 18b are connected to one another by a biasing mechanism 24 that extends between left and right mounting brackets 26a, 26b mounted at the upper, inner ends of the respective swing arms. The biasing mechanism 24 is shown in more detail in FIG. 4. The biasing mechanism 24 includes a hydraulic actuator 28 comprising a cylinder 30 that is attached by a pivot pin 31a to the left mounting bracket 26a and a piston rod 32 that is attached by a pivot pin 31b to the right mounting bracket 26b. A first mounting plate 34 is attached to the end of the piston rod 32 and a second mounting plate 36 is attached to the free end of the cylinder 30. A pair of tensioning bolts 38 are screwed into threaded holes in the first mounting plate 34 and extend through unthreaded holes in the second mounting plate 36 towards the pivot end of the cylinder 30. Each of these tensioning bolts 38 supports a compression spring 40, which is compressed between the head 38a of the bolt and the second mounting plate 36. The springs 40 exert a closing force on the hydraulic actuator 28. This force can be adjusted by rotating the heads 38a of the bolts 38 while the mechanism is in the closed position.

Figure 2:
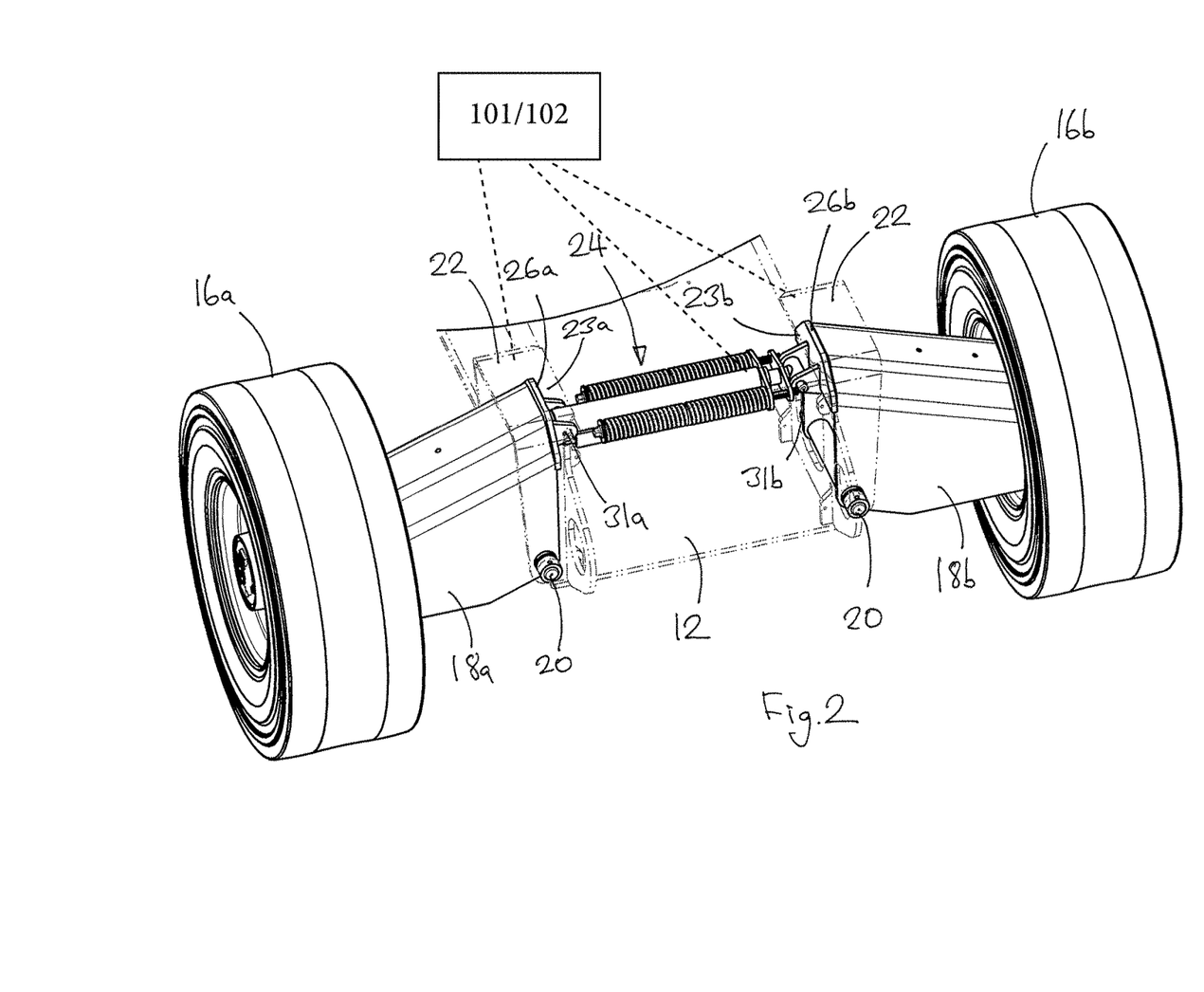
FIG. 2 is an isometric view showing a base unit for the mobile elevating work platform in a first operating condition.
Figure 3:
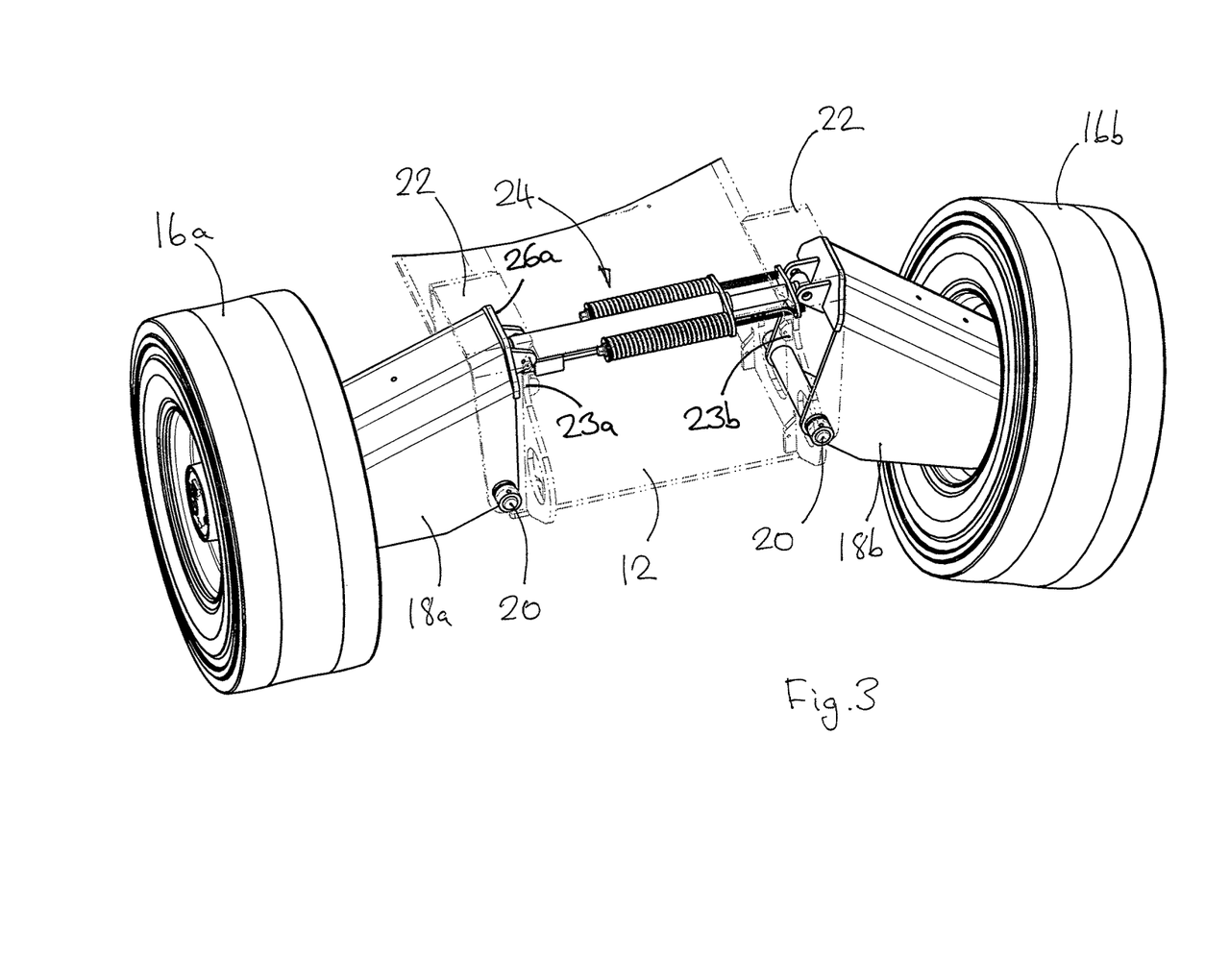
FIG. 3 is an isometric view showing the base unit in second operating condition.

The swing arms 18a, 18b can each pivot about the pivot pin 20 between (i) an upper position as depicted in FIG. 2 in which the swing arm is in engagement with the respective stop member 23a, 23b, and (ii) a lower position as depicted in FIG. 3 in which the right swing arm 18b is pivoted downwards and no longer engages the stop member. In the example depicted in FIG. 3 the left swing arm 18a is shown in the upper position in engagement with the stop member 23a.

The swing arms 18a, 18b will normally be in the upper position as depicted in FIG. 2 when the MEWP is standing on flat, level ground and the respective wheels 16a, 16b are fully supported by the ground. In this position, the hydraulic actuator 28 is in an unextended condition with the piston rod 32 retracted fully into the cylinder 30.

The compression springs 40 bias the swing arms 18a, 18b towards the upper position through the tensioning bolts 38. The tensioning bolts 38 are adjusted so that if the hydraulic actuator is inactive (unpressurised), the compression springs 40 exert a biasing force on the swing arms 18a, 18b that is slightly larger than the force needed to overcome the weight of the swing arms 18a, 18b and the associated wheels 16a, 16b. Therefore, the swing arms 18a, 18b are maintained in the upper position in contact with the stop members 23a, 23b even if the wheels 16a, 16b are out of contact with the ground and are suspended solely by the suspension mechanism. This may occur for example when the MEWP is standing on uneven ground.

In order to allow one or other of the swing arms 18a, 18b to pivot downwards to the lower position, the hydraulic actuator 28 must be activated by pressurising it with hydraulic fluid. This causes the actuator 28 to open. The force applied by the actuator 28 counteracts the effective biasing force of the biasing springs 40, allowing one of the swing arms 18a, 18b to pivot downwards to the lower position as shown in FIG. 3. Therefore, if one or other of the wheels 16a, 16b is suspended out of contact with the ground, the actuator 28 when activated will cause that wheel to drop down into contact with the ground or to press harder against the ground. This allows drive to be applied through the wheel.

The force applied by the actuator 28 is designed to be just enough to overcome the maximum compression force of the springs 40 at the end of the actuator stroke, so that the forces are balanced. This reduces the load/stresses on the chassis 12 and the swing arms 18a, 18b and allows unnecessary weight to be removed from the structure, providing a lower overall machine weight. There is provision for adjustment to the force provided by the actuator. The force exerted by the actuator must be sufficient that the moment exerted on the pivoting arm is greater than that exerted by the spring with the arm in the fully lowered position. A stop is provided to prevent the actuator over-compressing the spring.

When the lifting mechanism 4, 5 is activated, pressure is released from the hydraulic actuator 28 allowing the swing arms 18a, 18b to return gradually to their upper positions in engagement with the stop members 23a, 23b. Damping is applied to control the speed at which the swing arms return to the upper position when the actuator is deactivated to prevent jerking/slamming. The time taken for the swing arms 18a, 18b to return to their upper positions is less than the time it would take to lift the booms 4 into an unstable position. The stability of the platform is not therefore compromised. Alternatively, the machine may include a safety system that prevents the lifting mechanism from being activated unless the wheels are in the upper position and/or when the actuator 28 is activated/extended. The machine may also include a safety switch that prevents activation of the actuator 28 when the boom is raised.

Figure 5:
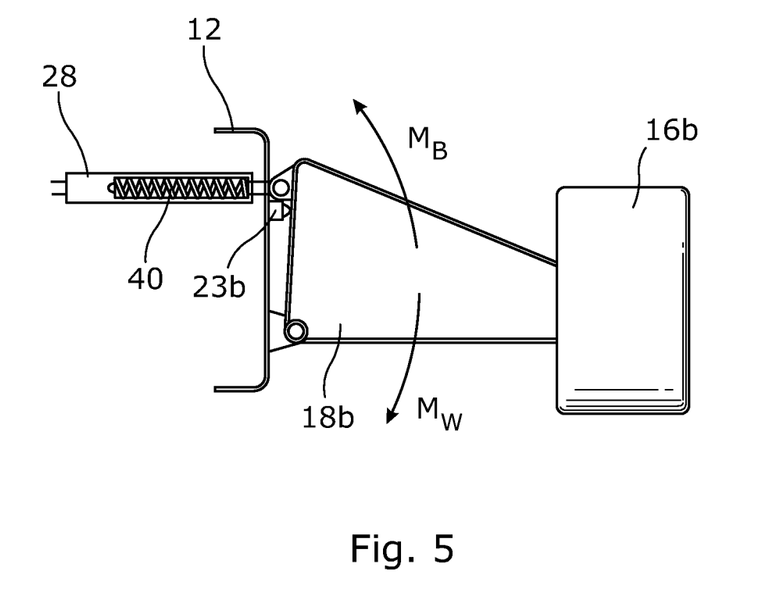
FIG. 5 is a schematic diagram illustrating the turning moments acting on a suspension element in a first operating condition.
Figure 6:
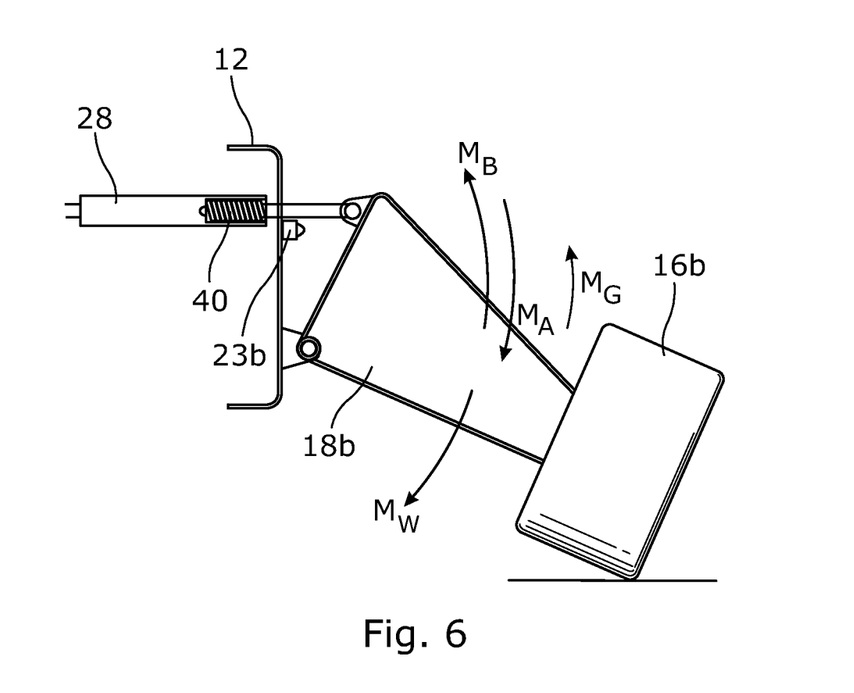
FIG. 6 is a schematic diagram illustrating the turning moments acting on a suspension element in a second operating condition.

The weight of the wheel and the swing arm, the biasing force provided by the compression springs and the force provided by the actuator all produce turning moments acting to cause the swing arm to rotate about the pivot pin 20 between the upper and lower positions. These turning moments are illustrated in FIGS. 5 and 6. In FIG. 5 the swing arm 18b is shown in the first operating condition in which the biasing force is greater than the force needed to maintain the swing arm in the upper position in engagement with the stop member 23b. In this condition the weight of the wheel 16b and the swing arm 18b produces a clockwise weight moment $M_W$ and the biasing force of the springs produces an anticlockwise biasing moment $M_B$. The biasing moment $M_B$ is greater than the weight moment $M_W$ and therefore the swing arm 18b is maintained in the upper position.

In FIG. 6 the swing arm 18b is shown in the second operating condition in which the actuator has been activated to allow the swing arm to drop to the lower position in which it engages the ground. In this condition the actuator produces a clockwise actuator moment $M_A$ which acts with the weight moment $M_W$ against the biasing moment $M_B$ and the anticlockwise moment $M_G$ produced by the ground reaction force. The sum of the actuator moment $M_A$ and the weight moment $M_W$ is greater than the biasing moment $M_B$ and therefore the swing arm is able to drop to the lower position.

More specifically, in the first operating condition:

$$M_B > M_W$$

or in a preferred embodiment:

$$M_B = A \cdot M_W \text{ where } A=1.0 \text{ to } 1.5, \text{ preferably } 1.0 \text{ to } 1.1$$

In the second operating condition:

$$M_A + M_W = M_B + M_G$$

so, $M_A + M_W > M_B$
or in a preferred embodiment:

$$M_A = B \cdot (M_B - M_W) \text{ where } B=1.0 \text{ to } 1.5, \text{ preferably } 1.0 \text{ to } 1.2$$

The ranges indicated above for the values of the coefficients A and B ensure that in the first operating condition the swing arm is held against the stop member in the upper position, while in the second operating condition the swing arm is allowed to fall into contact with the ground but most of its weight is still carried by the chassis, so that the stability is not significantly compromised.

Operation of the hydraulic actuator 28 may be controlled automatically or by the machine operator, via the control console 9. For example, the actuator may be activated by receiving an actuation signal from an activation control (or "Green button") that is mounted on the control console in the cage or a control box on the base. Alternatively, an activation signal can be generated using a footswitch mounted on the floor of the cage or by using a trigger switch on a joystick that is mounted on the control console in the cage.

More generally, the MEWP includes a control system 101 for controlling operation of the lifting mechanism, said control system 101 including a control device 102 configured to control operation of the actuator and operable to select either the first operating condition in which the biasing force is greater than the force needed to maintain the suspension element in engagement with the stop member when the wheel is suspended, or the second operating condition in which the biasing force is less than the force needed to maintain the suspension element in engagement with the stop member when the wheel is suspended. The position in the figures for the control system 101/control device 102 is schematic for illustration purposes and does not necessarily represent the position of the control system 101/control device 102.

In the case of automatic operation, the actuator 28 may be activated/pressurised when the drive system to the wheels is engaged, thus allowing any suspended drive wheel to drop down to the lower position and ensuring that the drive wheels are pressed firmly against the ground so that they can propel the MEWP for forward or reverse travel. When the drive system to the wheels is disengaged, the actuator 28 is deactivated/depressurised, causing the swing arms 18a 18b to return to the upper position in contact with the stop members 23a, 23b, to ensure maximum stability. The drive system and the lifting mechanism may also be interlinked to ensure that the lifting mechanism cannot be operated while the drive is engaged.

In the case of manual operation, the operator can decide when to maintain the swing arms 18a, 18b in the normal upper positions as depicted in FIG. 2 and when to allow one or other of the swing arms to pivot downwards to the lower position as depicted in FIG. 3. Usually, the swing arms 18a, 18b will be maintained in the upper position when the lifting mechanism is actuated to raise the boom, and they will be allowed to pivot to the dropped positions only when the boom is retracted. This allows the wheels 16a, 16b to follow the contours of the ground when the MEWP is standing on or travelling over uneven ground.

The base unit 2 may also be useful for other vehicles where a very high degree of stability is required, for example forklifts or telescopic handling machines.

Figure 7:
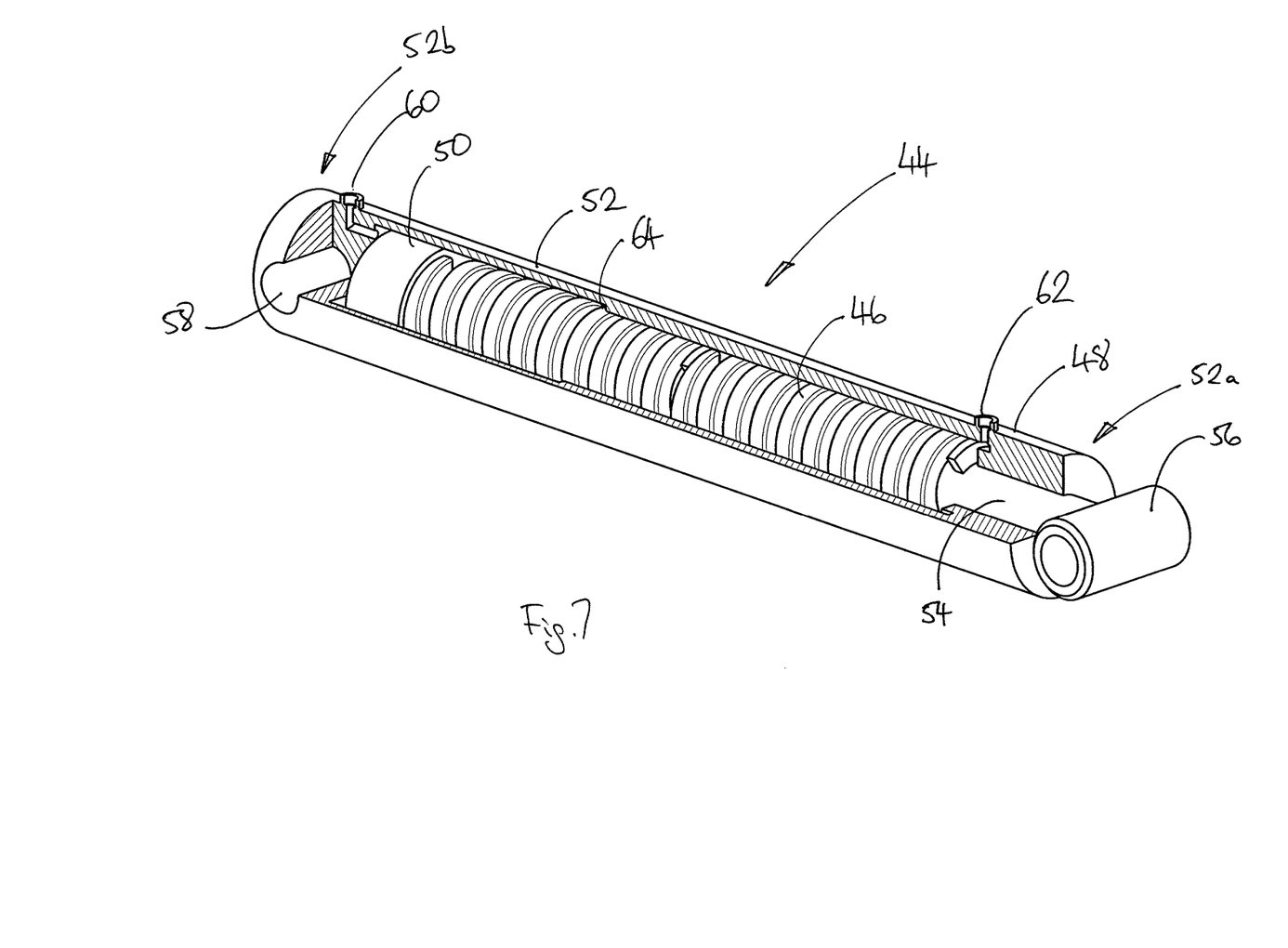
FIG. 7 is a partially cut-away isometric view of a suspension component of mobile elevating work platform according to a second embodiment of the invention.

FIG. 7 illustrates a modification of the MEWP shown in FIGS. 1 to 6, in which the previous biasing mechanism 24 comprising a hydraulic actuator 30 and a pair of compression springs 40 is replaced by a new modular biasing mechanism 44 in which a single compression spring 46 is positioned inside a hydraulic actuator 48. The hydraulic actuator includes a piston 50 mounted inside a cylinder 52, which connected via a rod 54 that extends through a first end 52a of the cylinder 52 to a pivot mount 56. A second pivot mount 58 is provided at the second end 52b of the cylinder 52. The spring 46 is compressed between the piston 50 and the first end 52a of the cylinder 52.

In the first operating condition the compressed spring 46 exerts a force on the piston 50, urging it towards the second end 52b of the cylinder 52, so that the swing arm is held in engagement with the stop element, as shown in FIGS. 2 and 5. In the second operating condition when the MEWP is standing on uneven ground, hydraulic fluid is supplied under pressure through an inlet 60 at the second end of the cylinder 52. This drives the piston 50 towards the first end compressed spring 46, thereby overcoming the bias force and further compressing the spring 46, so that the swing arm is allowed to drop under gravity out of engagement with the stop element and into contact with the ground, as shown in FIGS. 3 and 6. Hydraulic fluid from the void between the piston 50 and the first end 52a of the cylinder 52 flows out of the cylinder through an outlet vent 62. Movement of the piston 50 along the cylinder 52 is limited by an annular stop surface 64 provided on the inner surface of the cylinder 52 between the first and second ends 52a, 52b.

Various modifications of the invention are possible. For example the swing arms do not need to be connected to one another or to share the same suspension system. Instead, an individual suspension system may be provided for each wheel. In an alternative embodiment of the invention, the swing arms could be connected together by a tie rod with a spring at either end. The hydraulic actuator could be replaced by a different type of linear actuator or actuator mechanism. In a further modification of the apparatus shown in FIGS. 2 to 4, the two compression springs 40 (on either side of the actuator) may include a single spring or more springs.

The invention claimed is:

1. A base unit of a vehicle comprising a mobile elevating work platform, the base unit including a chassis and a plurality of wheels comprising at least three wheels that are each configured to support the chassis rigidly relative to a supporting ground surface, said plurality of wheels including at least one wheel of the at least three wheels that is mounted on the chassis by a suspension mechanism comprising a suspension element, said suspension element being arranged to pivot relative to the chassis about a substantially horizontal pivot axis between an upper position and a lower position, a stop member arranged to engage the suspension element in the upper position to limit upwards movement thereof, and a biasing mechanism configured to exert an upwards biasing force on the suspension element to urge the suspension element towards the upper position, said biasing mechanism including an actuator operable to adjust the biasing force so that, in a first operating condition the biasing force exerted on the suspension element is greater than an engagement force needed to maintain the suspension element in engagement with the stop member when the at least one wheel is suspended, and in a second operating condition the biasing force exerted on the suspension element is less than the engagement force needed to maintain the suspension element in engagement with the stop member when the at least one wheel is suspended, wherein said at least one wheel is configured to support the chassis rigidly when the suspension element of said at least one wheel is in the upper position and is engaged with the associated stop member.

2. The base unit of the vehicle according to claim 1, wherein the biasing mechanism includes a resilient biasing element that biases the suspension element towards the upper position, and wherein the actuator is operable to urge the suspension element towards the lower position.

3. The base unit of the vehicle according to claim 2, wherein the resilient biasing element applies a biasing moment $M_B$ to the suspension element that has a value greater than a weight moment $M_w$ of the suspension element when the suspension element is in the upper position.

4. The base unit of the vehicle according to claim 3, wherein the actuator is operable to apply an actuator moment $M_A$ to the suspension element, where $M_A$ has a value greater than the value $M_B-M_w$ when the suspension element is in the lower position.

5. The base unit of the vehicle according to claim 2, wherein the resilient biasing element is configured to apply a closing force to the actuator.

6. The base unit of the vehicle according to claim 2, further comprising an adjuster device for adjusting bias force applied by the resilient biasing element.

7. The base unit of the vehicle according to claim 1, wherein the suspension element and another suspension element comprise a pair of suspension elements arranged to pivot about substantially horizontal pivot axes, and a common biasing mechanism that interconnects the pair of suspension elements.

8. The base unit of the vehicle according to claim 1, wherein the suspension mechanism further comprises a drive device for driving at least one of said plurality of wheels.

9. The base unit of the vehicle according to claim 1, wherein at least one of said plurality of wheels is mounted rigidly to the chassis.

10. The base unit of the vehicle according to claim 9, wherein the at least one rigidly mounted wheel is steerable.

11. The base unit of the vehicle according to claim 1, wherein the vehicle comprises a lifting mechanism mounted on the base unit.

12. The base unit of the vehicle according to claim 11, wherein the vehicle further comprising a control system for controlling operation of the lifting mechanism, said control system including a control device configured to control operation of the actuator and operable to select either the first operating condition or the second operating condition.

13. The base unit of the vehicle according to claim 12, wherein the control system is configured to prevent actuation of the actuator when the lifting mechanism is in a lifted condition, so that when the lifting mechanism is in a lifted condition the suspension element is located in the upper position.

14. The base unit of the vehicle according to claim 13, wherein the mobile elevating work platform has a work platform mounted on said lifting mechanism.

15. The base unit of the vehicle according to claim 1, wherein the at least one wheel includes at least two wheels that are each mounted on the chassis by a corresponding one of the suspension mechanism comprising a corresponding one of the suspension element, said corresponding suspension elements being arranged to pivot relative to the chassis about a corresponding substantially horizontal pivot axis between a corresponding upper position and a corresponding lower position, wherein each of the at least two wheels are pivotable about the corresponding pivot axis independent of the other wheel of the at least two wheels.

* * * * *